No. 669,736. Patented Mar. 12, 1901.
Q. R. SMITH.
BIN CABINET.
(Application filed May 24, 1899.)
(No Model.)
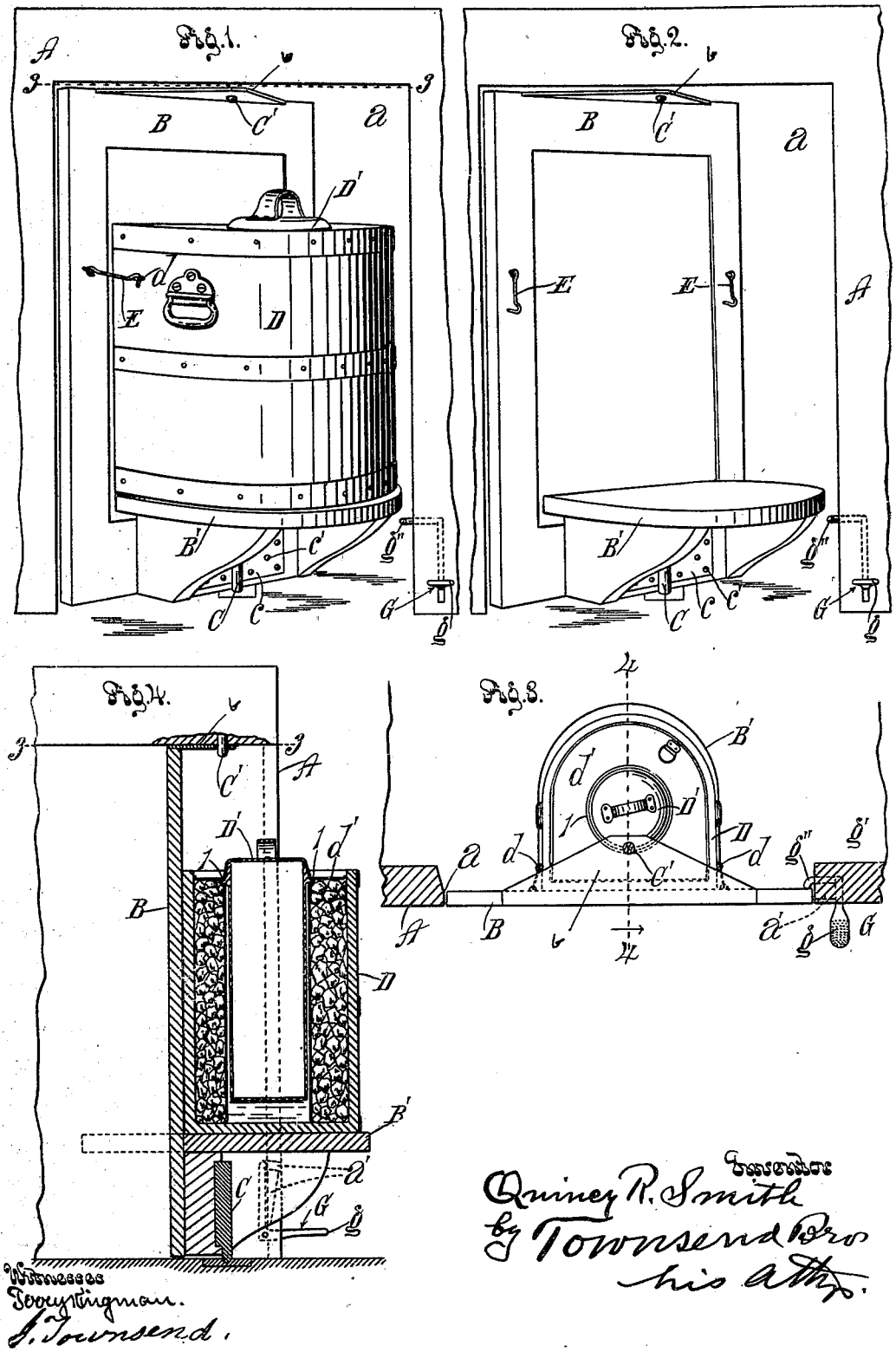

UNITED STATES PATENT OFFICE.

QUINCY R. SMITH, OF SANTA ANA, CALIFORNIA.

BIN-CABINET.

SPECIFICATION forming part of Letters Patent No. 669,736, dated March 12, 1901.

Application filed May 24, 1899. Serial No. 718,109. (No model.)

*To all whom it may concern:*

Be it known that I, QUINCY R. SMITH, residing at Santa Ana, in the county of Orange and State of California, have invented a new and useful Bin-Cabinet, of which the following is a specification.

The object of my invention is to provide a superior bin for holding materials or articles ready for easy access, but ordinarily hidden from view.

My invention is especially adapted for storekeepers' use, and is designed to be superior to any former bin for use behind a counter for holding ice-cream to be dispensed to customers, the advantage to be gained in this respect being that the ice-cream container, which is kept out of the way and out of sight whenever the cream is not being served, is accessible with the least possible expense of effort and time upon the part of the dispenser for bringing the ice-cream can out of the cabinet-case and placing it back into the cabinet-case. In this particular it will be understood that where ice-cream is dispensed from behind a counter it is important that space be economized and also that the ice-cream container shall be kept insulated from the outer air as much as possible and that the ice-cream container shall not be exposed to the outer air for any longer time than possible.

An object of my invention is to so construct and arrange the appliance as to economize as much as possible the space behind the counter and at the same time to secure a maximum capacity with a minimum weight and strength of construction.

My bin is a partially-rotating bin, the container being mounted behind a panel, which is pivotally mounted in an opening in a face-wall. The axis of the pivot of the panel is vertical and is located rearwardly of the panel in a plane that intersects the panel at right angles, substantially at its mid-width. The receptacle or rest for the ice-cream tub or other load is rearward of the panel in an extension of the pivot-axis, so that when the load is in place the pivot will be near the center of gravity of the load, but sufficiently in front of the rear of the opening of the ice-cream can or other container to cause the rear of the can to be brought in front of the face-wall in which the panel is mounted whenever the panel is turned to bring it behind the face-wall. I provide a foot-lever for turning the panel on its pivot to bring the pin outside the face-wall.

The accompanying drawings illustrate my invention.

Figure 1 is a perspective view of my cabinet-bin open. Fig. 2 is a like view with the container removed. Fig. 3 is a plan view on line 3 3, Fig. 4, the panel and container being shown in the closed position. Fig. 4 is a section of the bin on line 4 4, Fig. 3, the bin being shown open.

A indicates the face-wall of the case of the bin-cabinet. The cabinet may be of any style desired and may contain as many openings $a$ for the bin as there are bins required. In the drawings only one bin is shown.

B indicates the panel in the opening to close the same. A pivotal support is provided for the panel, as indicated at C C'.

D indicates a container at the rear of the panel and carried by the pivot C, the panel and container being secured together by any suitable means, such as the hooks E.

B' indicates a bracket to serve as a container-support, fastened to and projecting from the rear of the panel above the supporting-pivot C. The detachable container D is mounted on the container-support and is provided with staples $d$, into which the hooks E hook.

G indicates a lever pivoted in the face-wall and provided with a projecting finger $g''$ to project into the path of the edge of the panel.

$a'$ indicates a way in which the lever G operates, so that by treading upon the foot-piece $g$ the operator can bring the finger $g''$ forcibly against the edge of the panel B to turn the panel on its pivot C.

The pivot C is located in a vertical plane between the front of the panel and the center of the container, so that when the panel is turned upon its pivot the container is thrown out beyond the face-wall A.

$c$ indicates a plate on which the pivot is mounted, and which plate is fastened to the lower bracket B' by screws or nails $c'$.

The container D is preferably semi-elliptical, the chord of the ellipse being against the panel and one focus of the ellipse being at or rearward of the pivot C. Any other form of retainer may be used without departing from the spirit of my invention; but it is desirable that the center of gravity be brought as close as possible to the axis of the pivot.

D' indicates an ice-cream can in the container D.

d' indicates an ice-cover to fit in the container D and provided with a hole 1 to fit over the ice-cream can.

In practice my invention when used as an ice-cream bin ordinarily holds the ice-cream and the ice packing inside the case of the cabinet behind the face-wall A. When the attendant desires to serve cream, he will tread upon the footpiece g, thus throwing the finger g'' outward to push the edge of the panel B, thus to rotate the panel and carry the ice-cream container beyond the face-wall. The ice-cover being made of sheet metal affords a perfectly clean surface around the can. The can-cover can be removed and rested upon the ice-cover until the ice-cream has been put into the dishes or glasses in which it is to be served. Then the cover can be placed upon the can and the bin rotated to bring the container and the can behind the plane of the face-wall. The panel then fills the opening in the face-wall and the cabinet again presents a finished and unbroken appearance.

Now, having described my invention, what I claim as new, and desire to secure by Letters Patent, is—

1. A bin-cabinet comprising a case having a face-wall provided with an opening; a panel pivoted at its mid-width in said opening to close the same; a container fastened to the rear side of the panel and projecting rearwardly beyond the pivot; a lever pivoted in and extending through the face-wall and provided with a forwardly-projecting footpiece, and also provided with an arm; and a finger to project into the path of the edge of the panel to engage the rear of the edge of the panel to throw it outward when the footpiece is depressed.

2. A bin-cabinet comprising a case provided with an opening in its face-wall; a panel to form a portion of the face-wall and provided at the rear with a container-receptacle and pivoted to partially rotate on an axis which is located rearwardly of the panel in a vertical plane which intersects the panel at right angles substantially at its mid-width; and a lever mounted in and extending through the face-wall and provided in front of the face-wall with a forwardly-projecting footpiece and provided behind the face-wall with an arm; and a finger to project into the path of the edge of the panel to engage the panel and throw it outward when the footpiece is depressed.

3. A bin-cabinet comprising a case having a face-wall with an opening therein; a panel to fit the opening and provided at the upper end with an arm extending into the case; a shelf at the lower end of the panel; a container mounted on the shelf and detachably fastened to the panel; a pivot extending through the upper arm into the body of the case substantially above the center of gravity of the container; and a pivot fastened to the panel below the shelf in a line with the axis of the upper pivot.

4. A bin-cabinet comprising a panel pivoted at its mid-width and rearward of the face of the panel to the case of the cabinet and provided with a rearwardly-projecting shelf; and a lever pivoted in the face-wall of the case of the cabinet-bin and provided in front of said wall with a footpiece and behind said wall with a finger which projects into the path of the edge of the pivoted panel to throw said edge outward.

QUINCY R. SMITH.

Witnesses:
GEORGE T. BEAIZLEY,
G. A. WHIDDEN,
JAMES R. TOWNSEND.